United States Patent [19]
Zlotek

[11] Patent Number: 5,337,869
[45] Date of Patent: Aug. 16, 1994

[54] SPRAG RETAINER WITH ROTATIONAL RESTRAINT

[75] Inventor: Thaddeus F. Zlotek, Center Line, Mich.

[73] Assignee: Dana Corporation, Toledo, Ohio

[21] Appl. No.: 991,021

[22] Filed: Dec. 15, 1992

[51] Int. Cl.[5] ............................................. F16D 41/07
[52] U.S. Cl. .................................. 192/45.1; 192/41 A; 188/82.8
[58] Field of Search ........................... 192/41 A, 45.1; 188/82.8

[56] References Cited

U.S. PATENT DOCUMENTS

| | | | |
|---|---|---|---|
| 2,304,221 | 7/1946 | Dodge | 192/45.1 |
| 2,753,027 | 7/1956 | Troendly et al. | 192/45.1 |
| 2,856,045 | 10/1958 | Ferris | 192/45.1 |
| 2,966,246 | 12/1960 | Dodge | 192/45.1 |
| 3,049,206 | 8/1962 | Zlotek | 192/45.1 |
| 4,089,395 | 5/1978 | Fogelberg | 192/41 A |
| 4,635,770 | 1/1987 | Shoji et al. | 192/41 A |
| 4,997,070 | 3/1991 | Kinoshita | 192/41 A |
| 5,000,303 | 3/1991 | Shoji et al. | 192/45.1 |
| 5,070,976 | 12/1991 | Zlotek | 192/45.1 |
| 5,139,123 | 8/1992 | Rutke | 192/45.1 |

FOREIGN PATENT DOCUMENTS

| | | |
|---|---|---|
| 864887 | 4/1961 | United Kingdom . |
| 2190440 | 11/1987 | United Kingdom . |

*Primary Examiner*—Richard M. Lorence
*Attorney, Agent, or Firm*—Dykema Gossett

[57] ABSTRACT

A sprag retainer includes a cross member central portion which is biased into contact with an inner peripheral surface of an outer race. The central portion is spaced slightly radially outwardly from axial ends of the retainer. Thus, only the central portion contacts the outer race. The axial ends provide pilot diameters to ensure that the retainer is properly inserted into the outer race. The cross member forms a spring-like structure also assisting in the insertion of the retainer.

15 Claims, 1 Drawing Sheet

SPRAG RETAINER WITH ROTATIONAL RESTRAINT

BACKGROUND OF THE INVENTION

This invention relates to a sprag retainer wherein assembly is simplified over prior art sprag retainers.

Sprag retainers are utilized to maintain the position of sprag members which selectively transmit rotation between an inner race and an outer race in one-way sprag clutches. The sprag members must be properly positioned for proper functioning of a clutch. At the same time, it is desirable to reduce the complexity of sprag retainer assembly.

One prior art sprag retainer has annular axial end members with cross members connecting the two axial end members. Outer peripheral surfaces of each axial end member and at least a central portion of the cross members all extend radially outwardly for the same distance. All three surfaces are urged into contact with an inner peripheral surface of an outer race. The prior art sprag retainer uses the three contact areas to securely retain the sprag retainer relative to the outer race.

Deficiencies exist with such prior art sprag retainers. First, although it is desirable to maintain some contact between the sprag retainer and the outer race in some applications, it is also desirable to minimize the area of that contact. Sprag clutches are one-way, and transmit rotation between the inner and outer race when the rotational speed of a first race exceeds the rotational speed of a second race. On the other hand, if the rotational speed of the second race exceeds that of the first race, the sprag clutch will not transmit rotation. In this "overrunning" condition, the outer race typically rotates with the sprag retainer. When rotation, or torque, is transmitted the outer race deflects radially outwardly, out of contact with the retainer. To assist in this function, it is desirable that the contact area between the sprag retainer and the outer race be minimized. The above-discussed sprag retainer has an undesirably high amount of contact area.

Further, the prior art sprag retainer is somewhat difficult to assemble, in that the three axially spaced contact surfaces must each be individually forced into the outer race when assembling the sprag clutch. This may sometimes be difficult.

SUMMARY OF THE INVENTION

In a disclosed embodiment of the present invention, the axial ends of the sprag retainer have outer peripheral surfaces spaced radially inwardly by a very small amount from an outer peripheral surface of a central portion of the cross member. This central portion of the cross member provides the only actual contact surface between the outer race and the sprag retainer. The outer peripheral surfaces of the axial ends of the sprag retainer are closely spaced radially inwardly from the outer race, and provide pilot diameters for initially inserting the sprag retainer into the outer race. Thus, when assembling the sprag clutch one of the axial ends of the retainer is initially placed within the outer race. The radial clearance between the outer peripheral surface of the axial end and the inner peripheral surface of the outer race is less than 0.010 inch 0.25 millimeter). Due to the small clearance, the axial end of the retainer provides a pilot to ensure that the sprag retainer is properly aligned when inserted into the outer race, and that the sprag retainer is parallel to a central axis of the outer race.

As the sprag retainer is inserted, the central portions of the cross members begin to contact the inner peripheral surface of the outer race. Ramped surfaces are formed on each axial side of the central portion to assist in further insertion. Arched portions in the cross member connect the central portion to the axial ends. The arched portions extend radially inwardly such that they have outer peripheral surfaces spaced radially inwardly from outer peripheral surfaces of both the axial ends and the central portion of the cross member. The arched portions, in combination with the central portion of the cross member, form a spring-like structure which flexes radially inwardly to assist in the insertion of the sprag retainer into the outer race.

The inventive sprag retainer, when fully inserted, only has contact between the outer race and the retainer at the central portions of the cross members. Thus, the contact area is reduced over the prior art. Further, assembly of the retainer into the outer race is relatively simple since the radially smaller axial end serves as a pilot diameter ensuring that the sprag retainer is properly directed at initial insertion. Finally, the arches and central portion of the cross member form a spring-like structure that easily deforms to allow the sprag retainer to be forced into the outer race.

These and other features of the present invention can be best understood from the following specification and drawings, of which the following is a brief description.

DETAILED DESCRIPTION OF A PREFERRED EMBODIMENT

Figure 1:
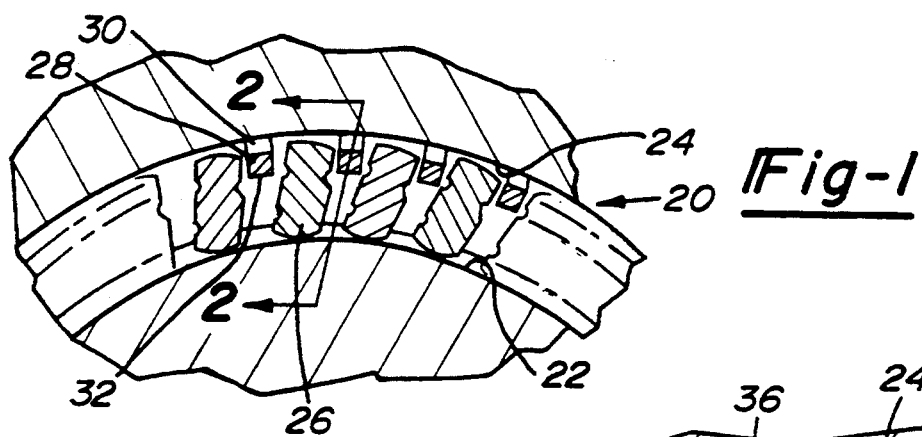
FIG. 1 is a cross-sectional view through a portion of a sprag clutch.

A portion of a sprag clutch 20 is illustrated in FIG. 1. Sprag members 26 are shaped, as is known, to selectively transmit rotation between one of inner race 22 and outer race 24, but not to transmit rotation in the opposite direction. As an example, if the clutch functions to transmit rotational drive from the inner race to outer race, and should the inner race be rotating at a higher rotational speed than outer race 24, sprag members 26 transmit rotation from inner race 22 to outer race 24. On the other hand, should outer race 24 be rotating at a higher rate of speed than inner race 22, the clutch is in a so-called "overrunning" condition. Rotational drive will not be transmitted through sprag members 26 from outer race 24 to inner race 22.

A sprag retainer 28 is designed to properly position the sprag members 26 relative to inner race 22 and outer race 24 to provide this one-way clutch action. Sprag retainer 28 is formed from two generally cylindrical axial ends 30 connected by cross members 32 which extend through circumferential spaces between adjacent sprag members 26. When the sprag clutch 20 is transmitting torque, sprag retainer 28 is free to rotate relative to outer race 24.

Figure 2:
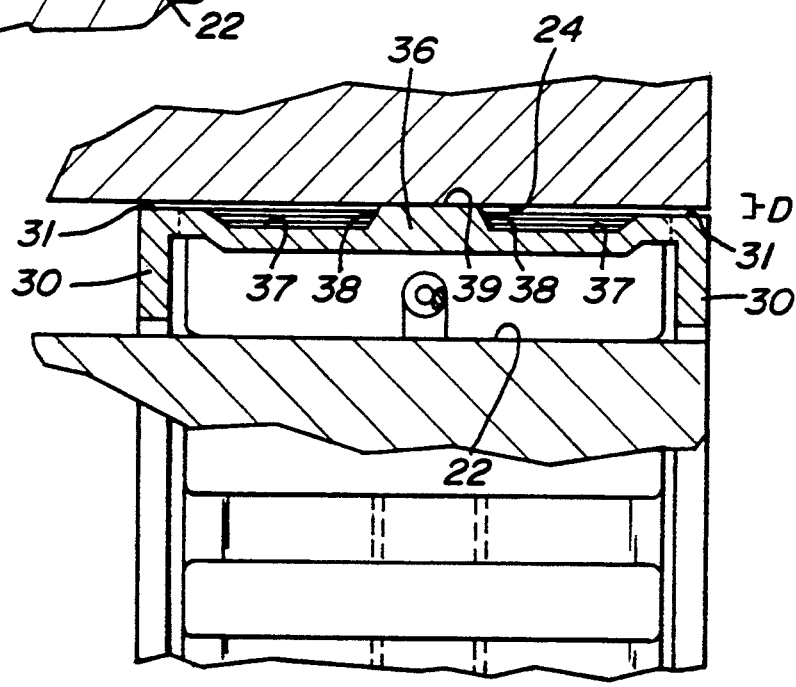
FIG. 2 is a cross-sectional view along line 2—2 as shown in FIG. 1.

As shown in FIG. 2, outer peripheral surfaces 31 of axial ends 30 are spaced radially inwardly from the outer peripheral surface 35 of a central portion 36 of cross members 32. The outer peripheral surface 35 of central portion 36 is biased into contact with an inner peripheral surface of outer race 24 while the outer peripheral surfaces 31 of axial ends 30 are spaced by a small amount (D) from the inner peripheral surface of outer race 24. In a relaxed position, the distance between the outer peripheral surface 35 of central portion 36 and the outer peripheral portion 31 of axial end 30 is preferably on the order of 0.001 to 0.010 inch (0.025 to 0.25 millimeter). In a most preferred embodiment, the distance is between 0.001 and 0.004 inch (0.025 to 0.10 millimeter). In the assembled position shown in FIG. 2, central portion 36 is bowed slightly radially inwardly. Thus, the clearance between the outer peripheral surface 31 of axial ends 30 and the inner peripheral surface of outer race 24 will typically be smaller than exact difference in diameter between the outer peripheral surfaces of axial ends 30 and central portion 36.

Axial ends 30 are connected through arches 37 to central portion 36 of cross bar 32. The outer peripheral surfaces of arches 37 are spaced radially inwardly from the outer peripheral surfaces 31, 35 of both axial ends 30 and central portion 36. Central portion 36 has inclined surfaces 38 on each axial side.

Figure 3:
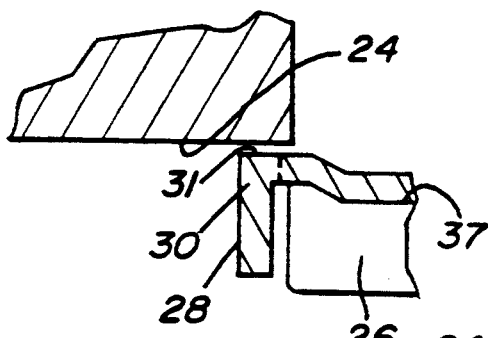
FIG. 3 is a partial cross-sectional view along a plane similar to that shown in FIG. 2.

As shown in FIG. 3, when assembling sprag retainer 28 into outer race 24, one axial end 30 is initially inserted into the inner peripheral surface of outer race 24. This axial end 30 serves as a pilot diameter ensuring that sprag retainer 28 is being inserted generally parallel to the axis of outer race 24. Since there is a slight clearance between the outer peripheral surface 31 of axial end 30 and the inner peripheral surface of outer race 24, it is not difficult to insert sprag retainer 28 beyond axial end 30.

Figure 4:
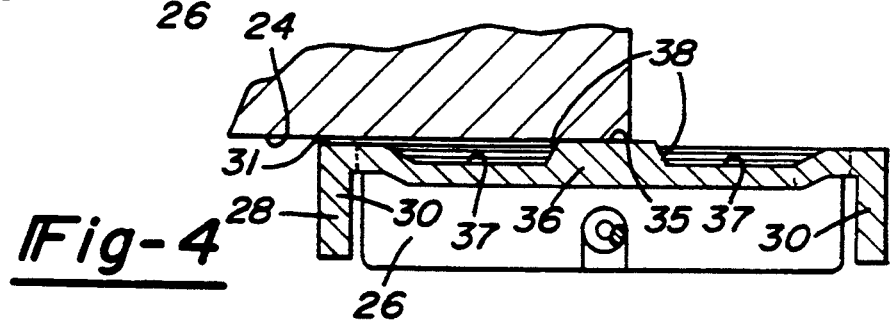
FIG. 4 is a cross-sectional view similar to that shown in FIG. 3, but showing a subsequent step in the assembly of the sprag retainer.

As shown in FIG. 4, central portion 36 of cross member 32 eventually contacts the inner peripheral surface of outer race 24. Initially, one of the inclined surfaces 38 contacts the inner peripheral surface of outer race 24. Central portion 36 is then forced further axially inwardly. Arches 37 facilitate radially inward bowing of central portion 36 to assist in further insertion of the sprag retainer 28. A spring force F is transmitted radially inwardly from central portion 36 through arches 24. A reaction force biases central portion 36 into contact with outer race 24.

With the inventive sprag retainer, the contact area between the sprag retainer and the outer race is over the relatively small area of central portion 36. Thus, when torque is transmitted the outer race 24 moves out of contact and frees the sprag retainer to rotate relative to outer race 24. Moreover, it is relatively easy to insert sprag retainer 28 into outer race 24. Since the axial end 30 provides a pilot, sprag retainer 28 is easily ensured to be properly inserted. Finally, the spring-like structure of the cross bar 32 ensures that the retainer 28 remains properly positioned between the inner race 22 and outer race 24, and accurately positions the sprags member 26.

The axial width of central portion 36 preferably ranges from is 0.030 to 0.080 inch (0.75 to 2.0 millimeters). In one preferred method of manufacture, the arch portions 35 are machined out of the cross members. In other embodiments, only some of the cross members need be formed with the central portions. Further, several contact portions could be formed on a single cross member.

Although a preferred embodiment of the present invention has been disclosed, a worker of ordinary skill in the art would recognize that certain modifications would come within the scope of this invention. For that reason the following claims should be studied to determine the true scope and content of the present invention.

I claim:

1. A sprag retainer comprising:
   a pair of generally cylindrical axial ends centered on a common axis, and spaced along said axis, each said axial end extending radially inwardly towards said axis; and
   a plurality of cross members extending axially and connecting said axial ends, said axial ends and said cross members having outer peripheral surfaces, said outer peripheral surface of a generally central portion of at least one of said cross members being spaced from said axis by a first radius, with said outer peripheral surfaces of said axial ends being spaced from said axis by a second radius, said first radius being greater than said second radius, the difference between said first radius and said second radius being less than 0.010 inch (0.254 millimeter), said cross members having radially inwardly extending arches which extend between said central portion and said axial ends, said arches having outer peripheral surfaces spaced from said axis by a third radius that is less than said second radius;
   whereby said outer peripheral surface of said central portion is adapted to contact an outer race, and said outer peripheral surfaces of said axial ends are adapted to be spaced from said outer race.

2. A sprag retainer as recited in claim 1, wherein the difference between said first radius and said second radius is greater than 0.001 inch (0.0254 millimeter).

3. A sprag retainer as recited in claim 2, wherein the difference is between 0.001 and 0.004 inch (0.0254 to 0.1016 millimeter).

4. A sprag retainer as recited in claim 1, wherein radially inwardly inclined surfaces are formed on at least one axial side of said central portion.

5. A sprag retainer as recited in claim 4, wherein radially inwardly inclined surfaces are formed on each axial side of said central portion.

6. A sprag retainer comprising:
   a pair of generally cylindrical axial ends each centered about a common axis, and spaced along said axis, each said axial end extending radially inwardly towards said axis; and
   a plurality of cross members extending axially and connecting said axial ends, at least some of said cross members having a central portion with an outer peripheral surface extending radially outwardly from said axis to a first radius, at least one of said axial ends having an outer peripheral surface extending radially outwardly from said axis to a second radius which is less than said first radius, and said cross members having arches on each axial side of said central portions, said arches connecting said central portions and said axial ends, said arches having outer peripheral surfaces spaced from said axis by a third radius which is less than said second radius;
   whereby said outer peripheral surface of said central portion is adapted to contact an outer race, and said outer peripheral surfaces of said axial ends are adapted to be spaced from said outer race.

7. A sprag retainer as recited in claim 6, wherein radially inwardly inclined surfaces are formed on at least one axial side of said central portions and lead into said arches.

8. A sprag retainer as recited in claim 7, wherein said radially inwardly inclined portions are formed on each axial side of said central portion.

9. A sprag retainer as recited in claim 6; wherein said central portions extend along said axis for a distance between 0.030 and 0.080 inch (0.0762 to 2.002 millimeters).

10. A sprag clutch comprising:
an inner race having a cylindrical outer peripheral surface centered about an axis;
an outer race having an inner peripheral surface generally uniformly spaced from said axis by a fourth radius;
a plurality of sprag members received between said outer peripheral surface of said inner race and said inner peripheral surface of said outer race; and
a sprag retainer receiving and positioning said plurality of sprag members, said sprag retainer having a pair of axial ends spaced along said axis and a plurality of cross members connecting said axial ends and extending axially along circumferential positions between said plurality of sprag members, each said axial end extending radially inwardly towards said axis beyond said cross members, each said axial end being spaced from said inner race, said axial ends having outer peripheral surfaces spaced from said axis by a second radius which is slightly smaller than said fourth radius, said cross members having a central portion with an outer peripheral surface biased into said inner peripheral surface of said outer race, and said cross members having arches connecting said central portion to said axial ends, said arches having radially outer peripheral surfaces spaced from said axis by a third radius that is less than said second radius.

11. A sprag clutch as recited in claim 10, wherein said central portion of said cross bar has an outer peripheral surface spaced at a first radius when said cross bar is in a relaxed position, said first radius being greater than said second radius by a difference of 0.001 to 0.010 inch (0.0254 to 0.254 millimeter).

12. A sprag clutch as recited in claim 11, wherein the difference is between 0.001 and 0.004 inch (0.0254 to 0.1016 millimeter).

13. A sprag retainer as recited in claim 10, wherein radially inwardly inclined portions are formed on at least one axial side of said central portion.

14. A sprag retainer as recited in claim 13, wherein radially inwardly inclined portions are formed on each axial side of said central portion.

15. A sprag retainer as recited in claim 10, wherein said cross members have radially inwardly extending arches which extend between said central portion and said axial ends, and outer peripheral surfaces of said arches being spaced from said axis by a fifth radius that is less than said second radius.

* * * * *